March 27, 1956　　　J. C. DIONNE　　　2,740,090
METHOD OF AND APPARATUS FOR DETECTING
FLAWS IN MAGNETIZABLE BODIES
Filed April 16, 1952　　　7 Sheets-Sheet 1

INVENTOR.
John C. Dionne
BY
Mann, Brown and Hansmann
attys.

March 27, 1956 J. C. DIONNE 2,740,090
METHOD OF AND APPARATUS FOR DETECTING
FLAWS IN MAGNETIZABLE BODIES
Filed April 16, 1952 7 Sheets-Sheet 2

INVENTOR.
John C. Dionne
BY
Mann, Brown and Hausmann
Attys.

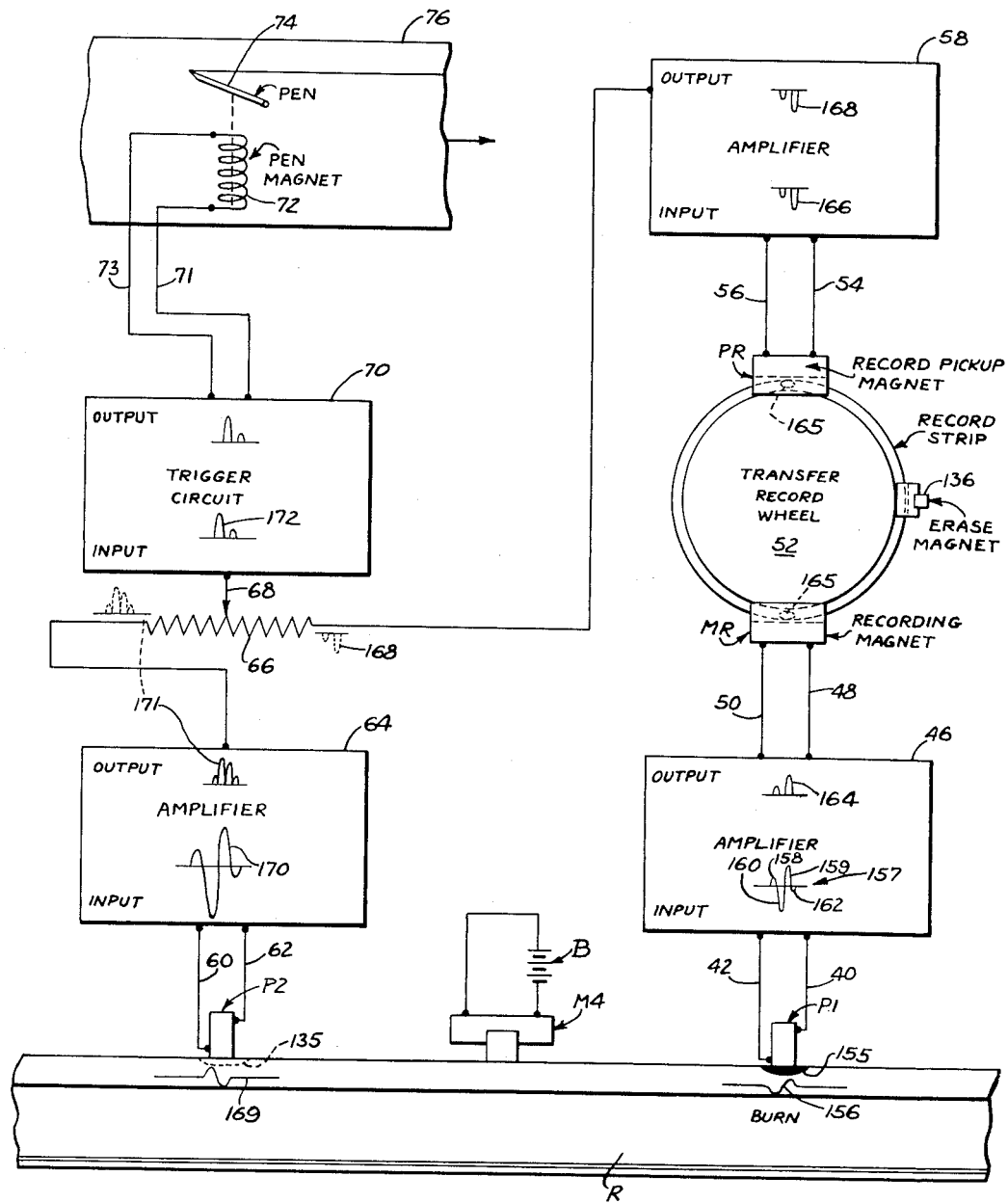

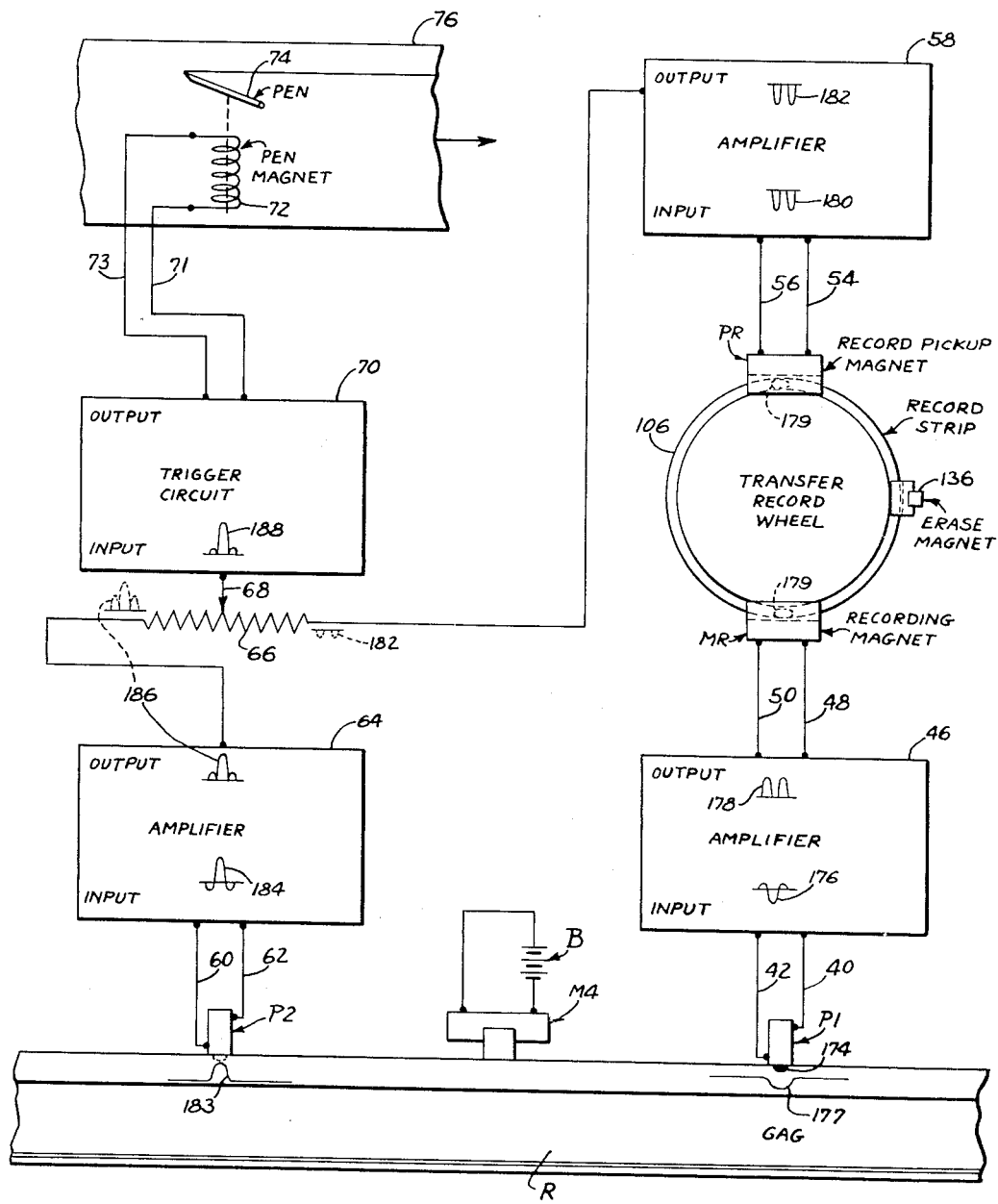

INVENTOR.
John C. Dionne
BY
Mann, Brown and Hansmann
Attys.

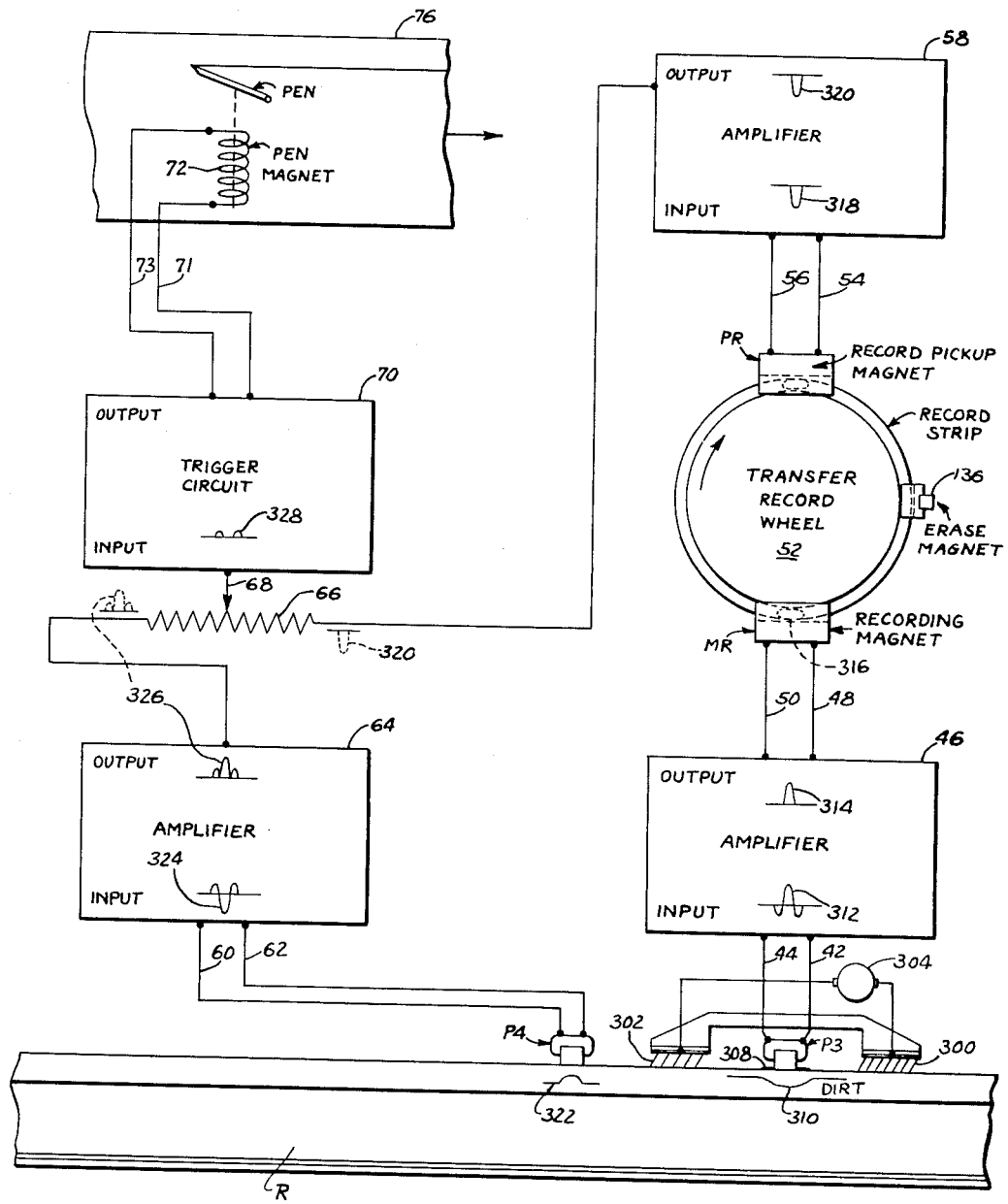

United States Patent Office 2,740,090
Patented Mar. 27, 1956

2,740,090

METHOD OF AND APPARATUS FOR DETECTING FLAWS IN MAGNETIZABLE BODIES

John C. Dionne, Chicago, Ill.

Application April 16, 1952, Serial No. 282,631

14 Claims. (Cl. 324—37)

The improved flaw detection apparatus and method comprising the present invention is primarily adapted for use in connection with the detection of flaws existing in rails laid in track. The invention is however capable of other uses and the same may, if desired, with or without modification, be employed for detecting flaws in other magnetizable bodies, particularly those of a continuous nature.

The present invention, in the principal illustrated embodiment thereof, is based upon the magnetic principle of flaw detection, and like certain other methods which have preceded it, it contemplated the provision of a continuous and progressive method utilizing a detector car having associated therewith electrical means for exploring a magnetized rail, and recording means responsive to the exploring means for making a record or otherwise rendering an indication when a flaw has been encountered by the exploring means.

Principal among the problems confronting designers of such equipment is that of providing an exploring device (usually a pick-up coil) together with amplifying equipment (usually electronic) which will distinguish between hazardous fissure defects and the relatively unimportant flaws such as burns, gags and the like which are not hazardous and which, for convenience of description, may constitute a group termed nonfissure defects. The term "fissure defects" or "fissures" as employed herein have transverse components and are invariably regarded as being extremely dangerous. The non-fissure defects further include scales, dents, corrugations and minor irregularities which are not regarded seriously.

If it were possible to magnetize a rail ideally so as to produce by residual magnetism local fields in the vicinity of fissure defects without producing significant fields in the vicinity of non-fissure defects, all indicated or recorded defects would be of importance and the problems which have given rise to the present invention would not exist. However, in practice, all known methods of magnetizing a rail will produce in many instances significant fields in the vicinity of some non-fissure as well as fissure defects and this is due to the fact that most of the troublesome non-fissure defects, such as burns, scales and the like are at, or close to, the surface of the rail where they become magnetically accentuated beyond their importance.

The problem of distinguishing fissure defects at various rail depths from non-fissure defects remains at present uppermost in the minds of those inventors who are working in the art of flaw detection by traveling detector car procedure, and various ingenious approaches have been devised with varying degrees of success. Such approaches have, to date, assumed definite trends of which three in particular are noteworthy.

Early recognition of the problem has resulted in the uniform and progressive application of a magnetizing flux to the rail and the subsequent attempt to selectively distinguish between the different field characteristics set up by the two types of defects by the use of supersensitive electronic exploring devices capable of rendering indications of one character for fissure defects and indications of another character for non-fissure defects. For example, the cathode-ray oscilloscope when operatively connected to a pick-up coil of suitable design will render different wave patterns for different flaw characteristics but it requires a thoroughly skilled and experienced operator to recognize the different wave patterns in transit so that remedial steps may be taken at the scene of operations and during any particular test run. Such a procedure is better suited for the subsequent and leisure study of photographic recordings of the oscilloscope wave output pattern in the laboratory on sections of test rail of known characteristics.

For on-the-scene checking operations where any given apparatus of this sort renders an indication or recording purported to distinguish fissure defects from non-fissure defects, human judgment is the controlling factor and this judgment must be coupled with a wide knowledge and comprehensive familiarity with the complex character of the output indication or recording that may be expected from any given type of defect. Some defects, particularly surface burns, have the chameleon-like ability to take on the magnetic properties of all other types of defects, including those of deep-seated fissures, and thus an impromptu opinion on the part of the test engineer sometimes, despite a profound knowledge of conditions to be expected, results in erroneous interpretation of a record.

Somewhat more reliable results have been attained by the sacrificing of available or potential indicative energy wherein cleaning or demagnetization of the upper regions of the rail is resorted to after initial longitudinal magnetization and prior to exploration of the rail. Even though this procedure may be so effective as to substantially erase residual local fields at the surface of the rail, its performance is, to some extent, at the expense of fields of reduced magnitude in the vicinity of fissure defects.

More recent attempts at selective identification of fissure defects as distinguished from non-fissure defects have involved the initial exploration of a portion of the rail which has been magnetized in one characteristic fashion (for example, longitudinally); the subsequent cleaning or erasure of residual local fields at the surface of the rail; the remagnetization of the rail in another characteristic fashion (for example, transversely); and a final re-exploration of the partially demagnetized rail. By such a procedure it is possible to utilize the findings of the two exploring operations to arrive at fairly reliable conclusions when proper interpretation of the two rendered indications is made.

Where this method of flaw detection has been incorporated in a fully automatic traveling detector apparatus, it has been necessary to take into account the time delay or lag existing from the instant when the first exploring device senses a given increment of rail to the time when the second exploring device arrives at the same rail increment. For this purpose time delay relay-actuated mechanism has been employed. Certain attempts to utilize this principle of flaw detection include the use of separate exploring devices each designed according to best engineering exigencies for expeditiously exploring the respective types of magnetic fields. The last-operating exploring device has associated therewith relay-operated means for disabling the indicating or recording instrumentalities associated with the earlier-operating exploring device at the time when the second device explores an increment of rail previously explored by the first device, providing of course its findings are the result of a non-fissure defect capable of potential recording by the first exploring device.

The efficacy of apparatus of this character is somewhat dimmed by certain operating factors, principal among which is the fact that the time-delay mechanism necessary for withholding the effective operation of the first exploring device until the second exploring device has traversed along the rail to the previously explored rail increment is constant in its time-lag so that it is necessary to drive the detector car at a constant and exact rate of travel. Equally if not even more important is the fact that fissure defects which underlie non-fissure defects are many times difficult of detection and to cope with such a condition it becomes necessary to provide fundamentally different exploring apparatus capable of exploring the same increment of rail at the same moment.

The present invention relates to this latter described type of flaw detection apparatus in that it involves the initial magnetization of the rail in one characteristic manner; exploration of the thus magnetized rail by one set of exploring instrumentalities; alteration of the magnetic characteristics of the rail, and subsequent re-exploration thereof by a different set of exploring instrumentalities. For progressive flaw detecting purposes along any given rail extent, means are provided for storing the data obtained from the first exploration of the rail until such time as the second exploration is effected, at which time the previously stored data is released so that the data obtained at different times from any given rail increment are emitted in the form of electronic impulses which are balanced one against the other to produce a final and conclusive indication or recording.

More specifically in carrying out the principles of the present invention it is contemplated that the indication rendered by the first exploring device, operating upon a rail increment which has been magnetized in one characteristic fashion, shall transfer its electrical indication to a moving record media which moves in timed relation to the movement of the detector car along the rail. This record media may be in the form of a strip of magnetizable material similar to magnetic tape, wire, or the like. After the initial exploration of the rail increment, the magnetic properties of the latter are altered in a predetermined fashion and a second exploration of the same rail increment, utilizing additional exploring equipment, takes place in due course when the exploring element per se carried by the detector car, traverses the initially explored rail increment and thus a different electrical impulse is initiated. At the exact time that this second electrical impulse is released, the stored data pertaining to the rail increment and contained on the record media is released by virtue of the bodily movement of the record tape to a point wherein the stored data encounters a record media exploring or take-off device. The two electrical impulses, one emitted under the control of the second exploring device operating on the rail increment, and the other emitted under the control of the moving record media and its take-off device, are fed simultaneously to the input section of an electronic circuit where these input signals are combined and caused to selectively control the firing or trigger action of the circuit output to thus actuate a pen relay or other suitable recording instrumentality.

The invention viewed in a broad aspect contemplates the exploration of an initially magnetized rail increment; the storage of the electrical impulse obtained by such exploration; the subsequent exploration of the same rail increment; and the simultaneous release of the electrical impulse resulting from the second exploration with the stored electrical impulse to produce useful work, as for example the rendering of an indication or recording.

In its broadest aspect, the invention is not necessarily limited to the residual magnetism method of rail flaw detection and the same may, with suitable modification, be applied to the electroinductive method of flaw detection, the necessary modification consisting in the application of heavy current through a particular rail increment; the initial exploration of the energized rail increment for changes in the magnetic field surrounding the rail and caused by any flaws which may be present; the storing of electrical impulses incident to such changes; re-exploration of the rail increment by other exploring devices for variations in the magnetic field that are characteristic of non-fissure defects; the simultaneous release of the stored impulse, together with the impulse resulting from the second exploration, the combination of the two released impulses, and the utilization of their resultant output (as in a trigger circuit) to perform useful work.

The provision of an apparatus of the character previously outlined above being the principal object of the invention, other objects of the invention are in general to provide a novel method of and apparatus for obtaining distinguishable flaw indications; to provide a novel method and apparatus for amplifying pick-up or take-off responses and converting them into characteristic impulses, and to provide a method and apparatus for integrating such characteristic impulses to achieve selective actuation of flaw indicating or recording devices.

Other objects and advantages of the invention, not at this time enumerated, will become more readily apparent as the nature of the invention is better understood.

In the accompanying drawings forming a part of this specification, certain preferred embodiments of the invention have been shown.

In these drawings:

Fig. 6 is a diagrammatic view similar to Fig. 5 illustrating the operation of the detector apparatus when a surface burn is encountered in the rail section;

Fig. 7 is a diagrammatic view similar to Figs. 5 and 6 illustrating the operation of the detector apparatus when a gag is encountered in the rail;

Fig. 10 is a schematic view similar to Fig. 5 illustrating the electro-inductive method of testing a rail for fissures in accordance with the principles of the present invention.

Explanations will be found throughout this specification of some of the theory which is believed to underlie the invention, but the disclosure and appended claims are not to be construed as dependent upon the truth or falsity in fact of the expounded theory, for the method and apparatus disclosed herein have been proved to be highly successful in accomplishing their intended purpose and the best known mode of utilizing the method and apparatus is disclosed herein in conformity with Sec. 4888 of the Revised Statutes. Furthermore, limitations should not be read into the appended claims by reason of the specific disclosure unless required by the prior art.

GENERAL DESCRIPTION

Figure 1:
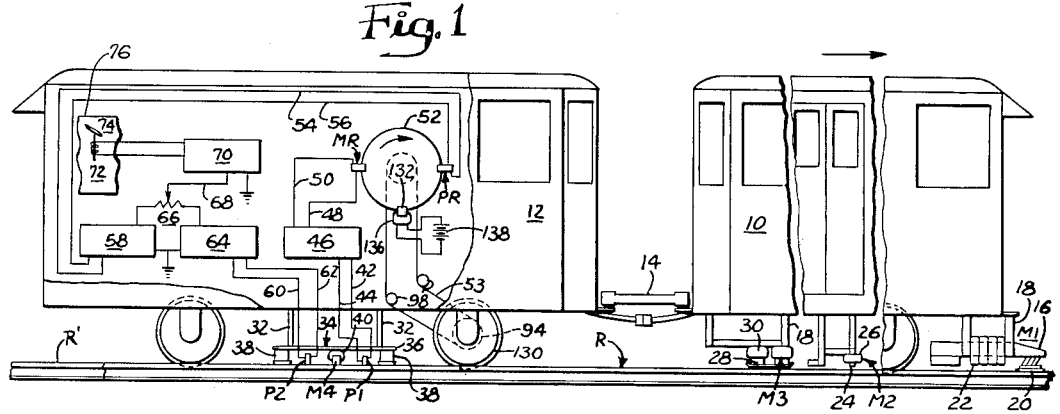
Fig. 1 is a side elevational view, schematic in its representation, of a rail flaw detector car including a front tow car and a rear trailer car equipped according to the principles of the present invention.
Figure 5:
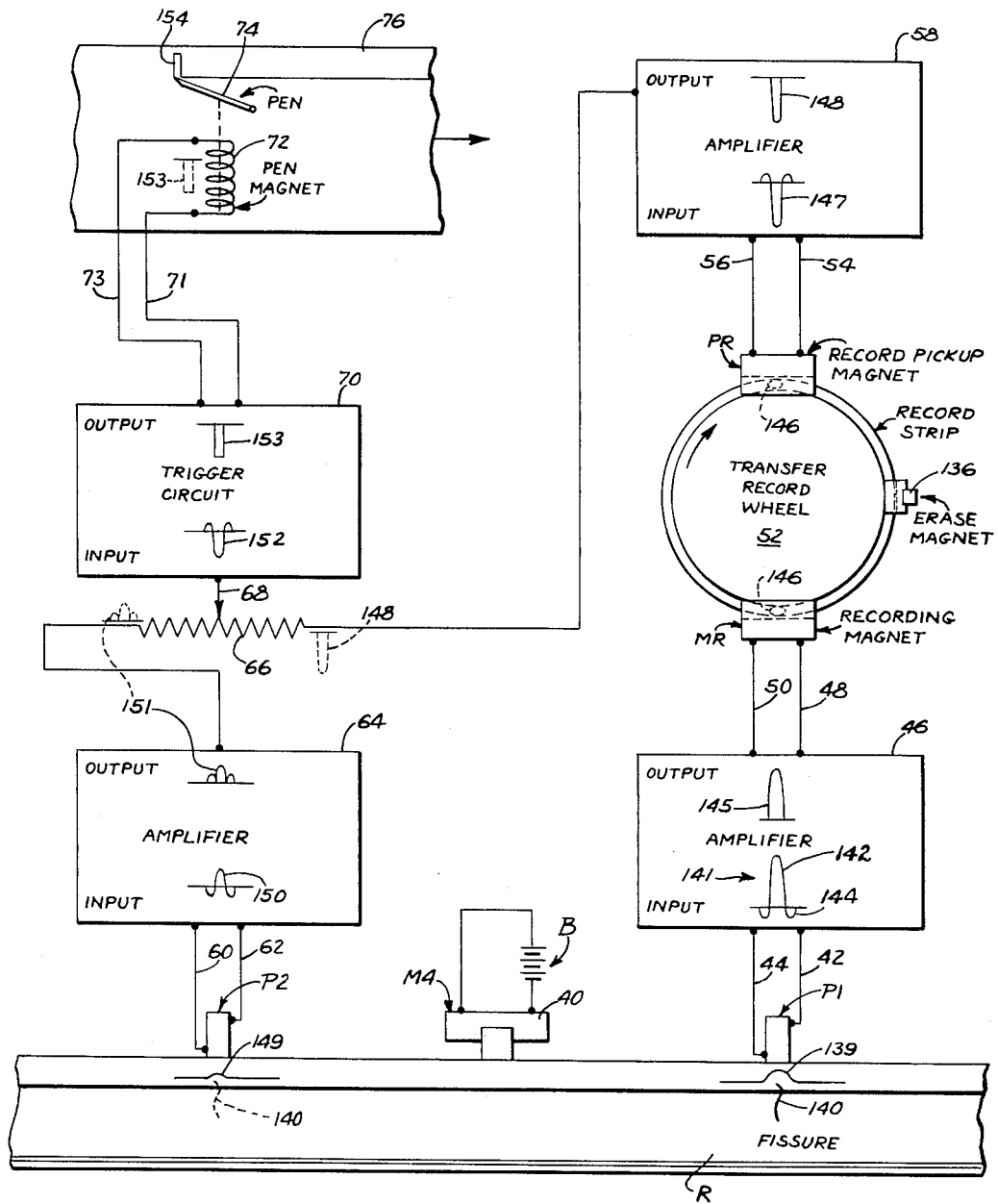
Fig. 5 is a diagrammatic view illustrating the operation of the detector apparatus when a transverse fissure is encountered in a rail section.

Referring now to the drawings in detail, what may be termed the basic principle underlying the invention is schematically and diagrammatically illustrated in Fig. 1 and is further diagrammatically illustrated in Figs. 5, 6 and 7 wherein selected types of rail defects are shown as undergoing investigation by the flaw detecting apparatus.

The flaw detection apparatus is adapted to be suitably installed in a traveling detector car including a front tow car 10 carrying the rail magnetizing equipment and a rear trailer car 12 which serves to carry the flaw detecting equipment including flux responsive devices, recording apparatus, etc., and also serving as accommodation quarters for the car crew. The two cars 10 and 12 are connected together by a suitable non-magnetic coupling device 14.

*The tow car*

The function of the tow car 10, in addition to its forward motivating drive as indicated by the arrows, is to place the rails R and R' upon which the apparatus travels in a requisite state of residual longitudinal magnetism preparatory to exploration of the magnetized rails by the detector equipment of the tow car 12. Toward this end the magnetization of each rail R and R' may be carried out by the arrangement diagrammatically shown in Fig. 1 and including three spaced electro-magnets or magnet groups M1, M2 and M3 for each rail suitably suspended from the tow car 10. The specific nature of the individual magnets M1, M2 and M3 forms no part of the present invention except in so far as their combined effect to produce a favorable type of rail magnetization is concerned and various types of magnetizing instrumentalities may be devised to effect a favorable rail magnetization, whether a single magnet or magnet group or plural magnets or magnet groups are employed. In brief, it may be stated that the function of the magnet M1 is to introduce a strong longitudinal flux into the rail with the flux being concentrated at its point of entry. While the magnet M1 is shown diagrammatically as including an L-shaped core or pole piece 16 suspended from the tow car by means of non-magnetic support bars 18 and having associated therewith a forward magnet shoe 20 and an energizing coil 22 having a generally horizontal axis, any suitable means to magnetize the rail and leave the same with a substantially longitudinal residual flux may be employed.

The magnet M2 is similarly diagrammatically shown as including a pole piece 24 having an energizing coil 26 associated therewith provided with a vertical axis. The magnet is particularly designed to minimize reverse flux in the rail behind its field of exploration. The general function of the magnet M2 is to induce a flux vertically downwardly into the rail and, in combination with the magnet M1, produce an additive magnetizing effect that can only be accomplished by successive rail magnetizations of the type indicated.

The magnet M3 includes dual pole pieces 28 and energizing coils 30, the latter having vertical axes. The function of the magnet M3 is to modify the longitudinal flux previously left in the rail and to minimize undesirable reverse longitudinal magnetism derived from stray flux and thus leave the rail more favorably magnetized for subsequent exploring operations by the various pick-up devices associated with the trailer car 12. Generally speaking, the combined function of the three magnets M1, M2 and M3 is to produce the strongest possible longitudinal flux in the rail and to redistribute the same in the most favorable manner for subsequent exploration by the detector apparatus, all in a manner that will be discussed more fully presently.

Still referring to Fig. 1, the trailer car 12, which carries the exploring and recording instrumentalities for investigating the nature of the residual magnetic fields set up in each rail R and R' around defects of different physical characteristics, has suspended therefrom by means of suitable supports 32 a sub-carriage assembly 34 including a horizontal support 36 above each rail having spacing shoes 38 at its opposite ends and which serves to operatively support in rail exploring position a leading sensing or exploring device in the form of a pick-up coil P1 and a trailing sensing or exploring device in the form of a pick-up coil P2. The pick-up coils P1 and P2 are adapted upon forward movement of the tow car 10 to progressively traverse the rail and, in response to the particular types of residual magnetic fields encountered along the rail by virtue of existing defects or flaws therein, emit electrical impulses which are subsequently utilized by suitable electronic amplification apparatus to perform recording functions, the nature of which will be treated presently. It will be understood, of course, that as the detector apparatus progresses forwardly, the rails R and R' are simultaneously magnetized by the magnetizing instrumentalities associated with the tow car 10, which includes the two sets of magnets M1, M2 and M3, respectively, and the rails are thereafter simultaneously explored by the two sets of pick-up devices P1 and P2. Since the exploring instrumentalities for the rails R and R' are identical, it is deemed necessary to show but one set of such instrumentalities and accordingly only the detector mechanism associated with the rail R has been illustrated in Figs. 1, 5, 6 and 7.

Carried by the support 36 and interposed along the rail R between the two exploring coils P1 and P2 is a relatively small deactivator magnet M4 having associated therewith a coil 40 the axis of which may extend transversely of the rail. The specific function of the magnet M4 will be outlined in detail later and for the present it may be noted that this magnet serves the purpose of partially cleaning or demagnetizing the rail after initial magnetization by the preceding magnets M1, M2, and M3 and prior to exploration of the rail by the pick-up coil P2. The magnet M4 in general serves to remove local residual fields, particularly those occasioned by fissures, and it also possesses the property of building up the flux which is ordinarily associated with certain types of surface blemishes such as burns and the like. The magnet M4 also under certain circumstances will alter or reverse the flux of certain local fields associated with defects such as gags, corrugations and some types of burns so that an impulse of greater intensity and reverse polarity will be initiated when such increments of the rail are explored by the pick-up coil P2.

The specific natures, or at least the functions of the two pick-up coils P1 and P2 will be set forth subsequently and for an overall understanding of the general nature of the invention, it is deemed sufficient to state that the pick-up coil P1 is particularly adept in detecting the types of local magnetic fields surrounding transverse fissures while the pick-up coil P2 is particularly adept in detecting the types of residual fields which are more characteristic of surface blemishes.

The pick-up coil P1 is electrically connected by lead wires 42 and 44 with the input side of an electronic amplifier 46 which is designed to eliminate certain portions of the input signal and to amplify other portions thereof and transmit the amplified signal through lead wires 48 and 50 extending from the output side of the amplifier to a recording magnet MR associated with a temporary recording and data storing device or record transfer wheel in the form of a rotary disc-like member 52, which is belt-driven as at 53 from one of the trailer vehicle wheels and carries a record media thereon, which is hereinafter referred to as the transfer record wheel. The record wheel 52 functions as a temporary impulse storing and transfer device for receiving data from the magnet MR and transmitting the same after a predetermined and exact time interval, commensurate with the rate of movement of the exploring device along the rail, to a record pick-up coil PR by means of which the stored magnetic impulse is taken from the recording wheel in the form of an electrical impulse and transmitted through lead wires 54 and 56 to the input side of a second electronic amplifier 58. The amplifier 58 serves to amplify the impulses received from the pick-up coil PR and to eliminate impulses of positive polarity.

The pick-up coil P2 which traverses the rail following the magnet M4 transmits any electrical impulse which may be generated therein by virtue of a residual magnetic field surrounding a surface defect through leads 60 and 62 to the input side of an electronic amplifier 64 which serves to reverse the polarity of the negative portions of the input signal and render the same positive while retaining such portions of the signal as may be of positive polarity.

The output signals of the two amplifiers 58 and 64 are combined through the medium of a bridge 66 and the resultant signal fed through a lead 68 to an electronic trigger circuit 70 which may be responsive only to input signals of one polarity, for example of negative polarity. The output of the trigger circuit 70 is operatively connected through leads 71 and 73 to a recording pen magnet 72 which will, upon energization, produce an indication by a recording pen 74 on a moving strip of record tape 76.

It is to be noted that the output signals issuing from the amplifiers 58 and 64 are of opposite polarity while the trigger circuit 70 requires an input signal of negative polarity to effect its trigger action. Therefore, if output signals of approximately the same voltage characteristics are simultaneously received at the input side of the trigger circuit 70, the two signals will cancel out so that the trigger circuit will fail to function and no recording will be made on the tape 76. It will be shown presently that an action of this type takes place when certain types of defects, such as gags, burns and the like are encountered by the pick-up coils P1 and P2. If the amplifier 64 emits a positive signal, which is the only type of signal of which it is capable, there will be no triggering action of the circuit 70 provided the amplifier 58 does not simultaneously emit a sufficiently greater negative signal, inasmuch as the circuit 70 is responsive only to appreciable negative input impulses. Thus the circuit 70 will be effective to energize the pen magnet 72 only when a negative input impulse is received from the amplifier 58 and which is not cancelled out by a positive input signal from the amplifier 64. It will be pointed out that this latter condition obtains when a fissure defect is encountered by the pick-up coils P1 and P2.

THE RECORDING TRANSFER APPARATUS

Figure 4:
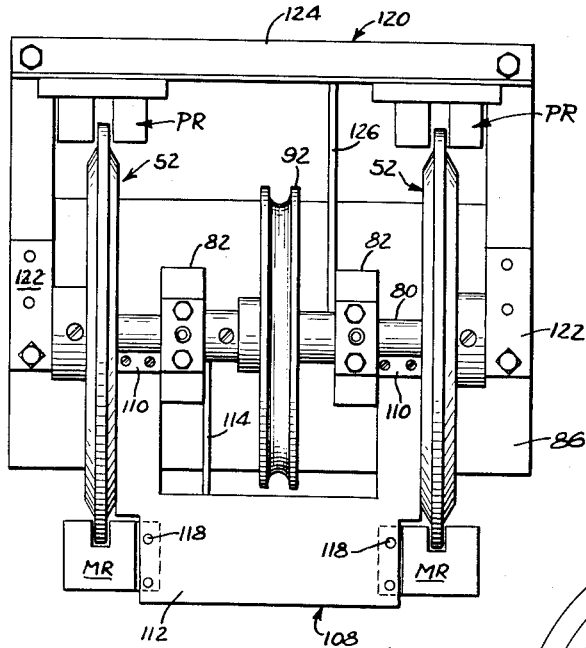
Fig. 4 is a top plan view of the record wheel assembly.
Figure 2:
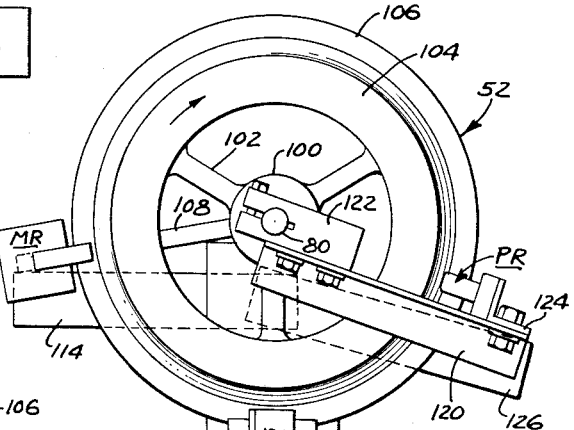
Fig. 2 is a side elevational view of a record wheel assembly employed in connection with the present invention.
Figure 3:
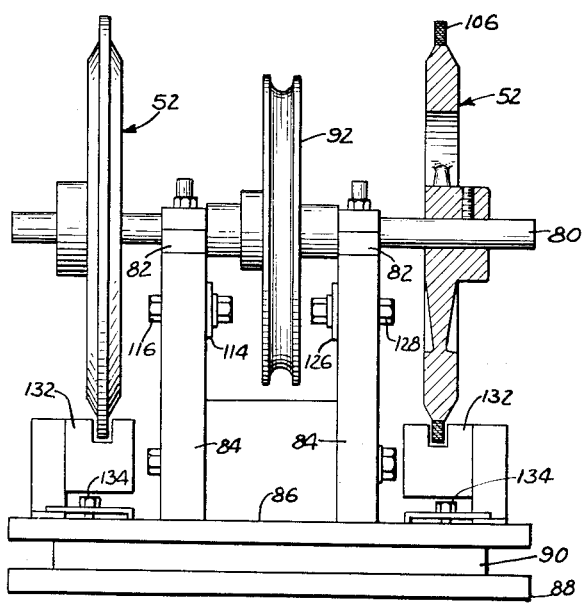
Fig. 3 is an end elevational view of the record wheel assembly, one of the record wheels being shown in section of Fig. 2.

Referring now to Figs. 2, 3 and 4 wherein the nature of the recording wheel 52 is illustrated, the wheel which accommodates the rail R is shown as being mounted adjacent one end of a driven shaft 80, while the wheel 52 which accommodates the rail R' is mounted at the other end of the shaft. The shaft 80 is mounted for rotation about a horizontal axis and is supported in bearing blocks 82 carried at the upper end of a pair of standards 84 supported upon a platform 86 which in turn is mounted upon a base 88 of wood, Bakelite, or other non-magnetic material through the medium of an interposed resilient pad 90. The two recording wheels 52 are pinned or otherwise secured to the shaft 80 and thus are constrained to rotate in unison with the shaft. A central driving pulley 92 which may be formed of wood disposed between the standards 84 receives thereover the driving belt 53 (Fig. 1) and the latter extends around a pulley 94 associated with one of the car axles. A pair of tensioning idler pulleys 98 serves to guide the belt 53 in its continuous path of movement.

Each recording wheel 52 includes a central hub 100 from which spokes 102 extend radially outwardly and serve to support the non-magnetic rim portion 104 of the wheel. The rim 104 may be formed of babbit metal on which there is mounted the record media proper 106. While the record media may be of any suitable form and character, it has been found that a large number of turns (for example, 75 turns) of conventional magnetic tape-recording material which provide a ring-like laminated member extending continuously around the periphery of the wheel and of substantial depth adequately suffice to accurately receive and store data in the form of electrical impulses received from the recording magnet MR for transmittal in the form of electrical impulses to the record pick-up coil PR with high fidelity preservation of the input impulse.

Still referring to Figs. 2, 3 and 4, a positioning bracket 108 of U-shaped design has its bifurcated end pivotally and loosely attached as at 110 to the shaft 80 and is mounted for free swinging movement about the axis of the shaft. The base connecting portion 112 of the positioning bracket 108 is adapted to loosely rest by gravity upon the distal end of a beam 114 (Fig. 2) the inner end of which is adjustably secured (i. e. for angular adjustment) as at 116 (Fig. 3) to one of the standards 84. The two recording magnets MR for the rails R and R', respectively, are bolted or otherwise secured as at 118 to opposite ends of the base portion 112.

A second positioning bracket 120 of angle piece construction and of U-shaped design is freely supported on the shaft 80 by means of split supporting members 122 and is provided with a cross piece 124 which carries at its opposite ends the two record pick-up coils PR. The distal end of the bracket 120 is adapted to rest by gravity upon a beam 126 similar to the beam 114 and the inner end of which is adjustably secured as at 128 to one of the standards 84 for angular adjustment about the shaft 80. It is to be noted that the effective tread diameters of the car wheel tread 130 (Fig. 1), axle pulley 94, the recording wheel pulley 92, the overall diameter of each recording wheel 52, as well as the effective longitudinal distance between the pick-up coils P1 and P2 are all designed according to engineering exigencies so that as the trailer car 12 advances along the rail a given rail increment will pass (relatively speaking) from effective cooperation with the pick-up coil P1 to effective co-operation with the pick-up coil P2 during the precise length of time that a given peripheral increment on the record media 106 will traverse an arcuate path extending from the recording magnet MR to the record pick-up coil PR. In other words, the time span between the instant when the pick-up coil P1 becomes magnetically coupled with a particular flux line on the rail and the instant when the pick-up coil P2 becomes magnetically coupled with the same flux line is coincident in duration with the time span between the instant when the recording magnet MR releases an impulse to the record media and the instant when the record pick-up coil PR becomes magnetically coupled with the flux increments occasioned by the magnetically recorded impulses. The beams 114 and 126 are adjustable on their respective standards 84 to permit initial adjustment of the apparatus to secure coincidence of time intervals as just described, and obviously persons skilled in the art may modify the structure to employ vernier devices if desired.

An erase magnet 132 is bolted or otherwise secured as at 134 on each side of the platform 86 and the two magnets 132 co-operate with the record media to completely erase all recorded data as this data leaves the pick-up magnet PR and proceeds in a clockwise direction (Fig. 2) toward the recording magnet MR. Each erase magnet 132 includes a coil 136 which, as shown in Fig. 1, is adapted to be continuously energized by a suitable source of direct current such as has been designated at 138 (Fig. 1).

AMPLIFIER CHARACTERISTICS

Before entering into a description of the specific character of the three amplifiers 46, 58 and 64 and of the trigger circuit 70, all of which have been diagrammatically illustrated in Fig. 1, it is deemed pertinent to explain the intended functions of these electrical devices by observing their input and output characteristics when various types of flaws are encountered by the detecting apparatus in the rail R. In Figs. 5, 6 and 7, the operation of the various amplifiers has been illustrated in connection with three respective characteristic types of defects, namely fissures, burns and gags and it is thought that when the principles involved in connection with these three types of defects have been understood, persons skilled in the art will readily perceive the operation of the various electronic devices when other types of rail irregularities are encountered.

*Fissure detection (Fig. 5)*

Figure 8:
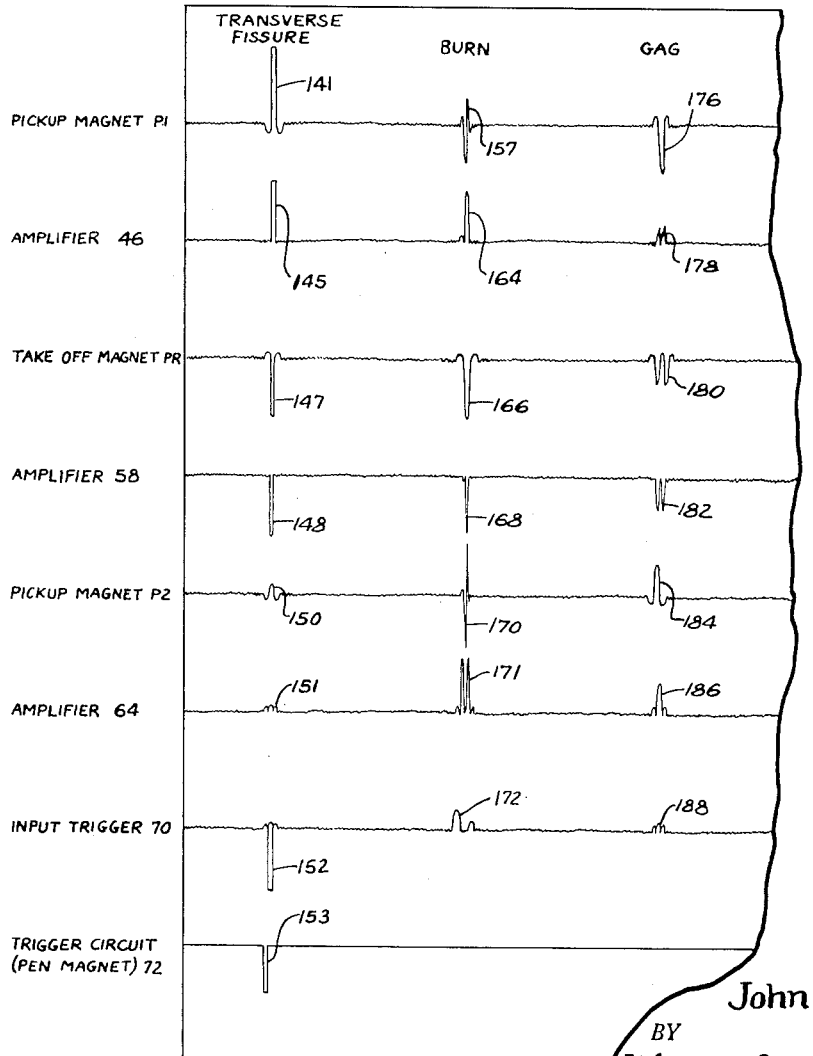
Fig. 8 is a fragmentary view of a chart containing approximate and theoretical oscillograms illustrating the input and output impulses occurring in various stages of the electronic equipment employed for detecting purposes when defects of selected characteristics are encountered in a rail section by the detector apparatus.

Referring now to Figs. 5 and 8, a typical transverse fissure 140 is diagrammatically shown in the rail R and the pickup coil P1 is illustrated as being in a position wherein it overlies the fissure and is consequently inductively coupled with the magnetic field 139, also diagrammatically illustrated, surrounding the fissure and incident to the previous combined magnetizing effect of the three magnets M1, M2 and M3 associated with the tow car 10. While various fissure defects will establish varying magnetic fields, it has been found that with a pickup coil, such as the coil P1, the fissure field 139 will produce an electrical impulse 141 in the coil which may be referred to as being generally of modified W-shape and having a substantial positive peak 142 and straddling negative peaks 144 of lesser extent. The amplifier 46 receives such an impulse at the input side thereof, as shown in the rectangular box outline representing this amplifier. The pickup coil P1 which receives this type of impulse by virtue of its coupling with the magnetic field of a characteristic fissure, such as the fissure 140, may vary in its design, but it has been found that if the pickup coil P1 is of the type shown and described in my copending application, Serial No. 59,955, filed November 13, 1948, for a Flaw Detection Pickup, and is used in the manner disclosed therein, this W-response will be predominantly established and the impulse passed to the amplifier 46.

The amplifier 46 is selective in its response to fissure impulses of this type and, in the output section of the amplifier, the negative peaks 144 are eliminated and only the positive peak 142 is preserved, thus producing the wave form 145. The recording magnet MR thus receives only a positive signal from the amplifier 46 and accordingly, as the continuous circular record media ring or band 106 is magnetically coupled with the magnet MR, an increment of the band in the vicinity of the magnet becomes magnetized in such a manner as to produce a magnetic flux in the vicinity of the magnet which is a substantial reproduction of that portion of the magnetic flux surrounding the fissure 140 in the rail R which produces the positive portion 142 of the W-shaped impulse wave pattern. This magnetized increment of the record media 106 on the record wheel 52 is shown at 146 and travels throughout an arcuate path on the periphery of the wheel and is ultimately brought into a position wherein its field becomes inductively coupled with the record pickup or take-off magnet PR and produces a negative polarity impulse identical with the input impulse originally applied to the recording wheel, since amplifier 58 requires a negative input signal. This impulse 147 is transmitted through the leads 54 and 56 to the input side of the amplifier 58. From the output side of the amplifier 58 an amplified negative impulse 148 is applied to the bridge 66 where it again appears at 148 and is combined with any impulse which may be issuing from the output side of the amplifier 64.

During the time that the increment 146 of the record media which has been magnetized by the magnet MR is moving toward the record pickup magnet PR, the deactivator magnet M4 as well as the pickup magnet P2 is approaching the fissure 140. When the magnetized increment on the record media is at some intermediate point between the two magnets MR and PR, the fissure 140 is traversed by the magnet M4. The coil 49 of the magnet M4 is adapted to be continuously energized from a suitable source of direct current such as the battery B. The action of the magnet M4 sets up a transverse flux that affects the residual magnetic fields surrounding various types of flaws to different degrees and it has been found that its action on a fissure field such as the field 139 is such as to greatly reduce the strength of the field without substantially altering the character of the impulse that it produces in a longitudinal pick-up coil, and thus, in the case of the fissure defect 140, the field may be nearly eliminated as shown at 149 so that when the pickup coil P2 encounters this field an impulse of very small potential, if any, is applied to the amplifier 64. The reduction in size of the original W-shape impulse produced by the pick-up coil P1 is illustrated diagrammatically at the input side of the amplifier 64 at 150.

The function of the amplifier 64 is to render the negative portions of all incoming impulses positive, while allowing the positive portions of existing input impulses to remain undisturbed. However, since the character of the W-shape input wave applied to amplifier 64 is of very small potential, the resultant output signal 151 issuing from the amplifier 64 and fed to the bridge 66 is insufficient to materially modify the negative character of the output signal 148 from the amplifier 58. The input to the trigger circuit 70 therefore consists mainly of the rather substantial negative impulse 152 issuing from the amplifier 58.

The nature of the trigger circuit 70 is such that its trigger discharge action will take place only when a predominantly negative impulse is received by this circuit. Thus, in the case of the fissure 140, the input to the trigger circuit is, in fact, predominantly negative so that a characteristic square top negative impulse 153 is rendered at the trigger circuit output. As will be hereinafter explained, negative impulse 153 is accompanied by an increased current flow through the pen magnet 72, thus causing the pen 74 to render an indication 154 on the moving record tape 76.

*Burn detection (Fig. 6)*

Referring now to Fig. 6 wherein the operation of the equipment has been illustrated, when a burn such as the one diagrammatically shown at 155 in the rail R is encountered, it is pointed out that the impulse wave response occasioned by the pickup coil P1 when burns are encountered is somewhat varied due to the fact that the magnetic field surrounding a burn may vary within wide limits. Some burns even have the chameleon-like ability to take on the magnetic properties of other types of defects, such as of fissures, gags, shelly rail and the like, as far as the electric pickup impulse is concerned. Thus, a fissure-like inverted W-shape impulse may possibly be transmitted to the amplifier 46, but when the magnetic field occasioning such an impulse is treated by the deactivator magnet M4 at the rail R, the fact that the field arises by surface generation rather than sub-surface generation will permit the magnet to alter the characteristic of the field to distinguish the input signal to the amplifier 64 from a true fissure impulse. This aspect of burn characteristics will be treated later.

One prevalent type of burn impulse occasioned by a magnetic field 156 is designated at 157. This impulse, as shown, has a small positive peak 158 and a large positive peak 159, together with a major negative peak 160 and a minor negative peak 162. Such an impulse is transmitted to the input side of the amplifier 46. The amplifier 46 is characterized by the phenomena that it will eliminate the negative portions 160 and 162 of burn impulses such as the impulse 157 while retaining the positive impulses 158 and 159. Thus, the output of the amplifier takes on the wave form indicated at 164. This impulse is magnetically impressed on the record media as at 165 where it is stored during the length of time that it takes for the pickup magnet P2 to encounter the burn 155, at which time it is converted back to its impulse form, as at 166, and transmitted through the leads 54 and 56 to the amplifier 58. The amplifier 58 receives, amplifies and transmits only negative impulses, and thus the amplified output signal 168 is similar to the input wave form 166 and is applied to the bridge 66.

During the time that the magnetized increment 165 of the record media 106 is traveling from the recording magnet MR to the record pick-up or take-off magnet PR, the magnetic field 156 of the burn 155 is treated by the deactivator magnet M4. The action of the magnet M4 on this burn field will vary, but for a wave pattern of the type shown at 156, its action is to intensify the field and possibly alter its impulse-producing characteristics by inverting the polarity of the field, as shown at 169, so that the impulse 170 generated by the pickup coil P2 and applied to the amplifier 64 assumes an enlarged inverted wave form shown.

As previously explained, the amplifier 64 will render the negative portions of the incoming impulse positive without disturbing the positive portions of these impulses, thus producing the signal 171 at the output side of the amplifier. This output impulse 171 is applied to the bridge 66 and combined with the other input signal 168 issuing from the amplifier 58. Since the signals 168 and 171 at the input of the trigger circuit 70 are of opposite polarity, the net result is that the signals substantially cancel each other as at 172, so that there is no flashing of the trigger circuit 70. Since the trigger circuit 70 fails to produce an output signal, the recording pen magnet 72 remains deenergized and the pen 74 will fail to produce an indication on the tape 76.

It will be understood, of course, that the particular wave form 157, selected for illustration of a burn, will vary throughout wide limits, but the principle involved remains substantially the same as that discussed herein. In any event, regardless of the nature of the burn field, there will be a strong tendency toward mutual cancellation of input signals at the trigger circuit 70 and consequent inability of the latter to energize the pen relay magnet 72.

Gag detection (Fig. 7)

The characteristic wave pattern commonly produced by the pickup coil P1 when a gag such as has been indicated at 174 is encountered is shown at 176. The magnetic field occasioning this wave form is shown at 177. This wave pattern 176 is ordinarily fairly consistent as regards its wave form and polarity. Such a wave form resembles the inverted wave form 141 for a fissure. When the wave form 176 is transmitted to the amplifier 46, and the positive output signal 178 magnetically applied as at 179 to the record media 106, the magnetized increment 179 of the record media produces an input signal 180 at the amplifier 58 and the resultant output signal 182 is fed to the bridge 66.

Simultaneously with the amplification and conversion of signals through the amplifier 46, magnets MR and PR, and amplifier 58, the magnet M4 converts the field of the gag 174 to a magnetic form 183 wherein it will produce a wave pattern such as is shown at 184 by the pickup magnet P2. The magnet M4 thus has the ability to completely reverse the polarity of the gag wave form and substantially increase its amplitude. The net result of this is to produce a wave pattern 186 at the output of the amplifier 64 which is transmitted to the bridge 66 for commingling with the input signal 182 and for passage of the input signals 182 and 186 to the input of the trigger circuit 70.

Due to the character of the wave forms 182 and 186, there will be some cancellation of the negative and positive wave portions, but the input signal 188 will be entirely positive, and there will be no flashing of the trigger circuit 70, due to its polarized characteristics. The pen magnet 70 will thus remain deenergized so that no indication will be produced by the pen 74.

Wave form chart (Fig. 8)

For convenience of illustration and for a composite portrayal of the principles of operation previously outlined in connection with the detection of dangerous fissure defects and relatively harmless burn and gag defects, the chart of Fig. 8 has been presented. This chart portrays the various characteristic wave forms of the signals or impulses emanating from the pickup magnets P1 and P2, the record take-off magnet PR and the amplifiers 46, 58 and 64, and the input wave forms of the signal passed to the trigger circuit 70, as well as the square top wave form 153 produced at the output of the trigger circuit and which results in the pen indication 154.

THE ELECTRO-INDUCTIVE METHOD OF FLAW DETECTION

Referring now to Fig. 10, it will be seen that the principles of the present invention may be applied to the electro-inductive method of flaw detection. A pair of electrical brushes 300 and 302 energized by a direct current generator 304 serves to pass an electrical current longitudinally through a portion of the rail R. An inductive pickup P3 (which preferably comprises a pair of oppositely wound inductive coils) has its magnetic core transverse to the longitudinal axis of the rail so that correct interception of the magnetic flux lines can be made. This pickup P3 is adapted to explore the rail progressively at a region between the two brushes 300 and 302. A second inductive pickup P4, which may be similar to the pickup P3, is positioned substantially immediately behind the trailing brush 302, where it is responsive primarily to residual magnetism in the rail left by the current passage. For electroinductive detection, the deactivator magnet M4 is not employed, inasmuch as the magnetic field surrounding all types of defects including fissures, burns, gags and the presence of sand, dirt or rust on the rails is abruptly altered when the trailing brush 302 has progressed beyond the flaw.

A dirt spot 308 is shown as existing on the section R of the rail illustrated. The pickups P3 and P4 are shown as being electrically connected to the electronic detection apparatus including the amplifiers 46, 58 and 64, bridge 66, trigger circuit 70 and pen magnet 72, as previously described in connection with the residual magnetic detection of rail flaws. Thus, a detailed description of these instrumentalities is deemed to be unnecessary for an understanding of the principles involved in the electro-induction method, it being considered sufficient to explain the general operation of the detection apparatus when a non-fissure defect, such as the dirt spot 308 is encountered. It is not even deemed necessary to illustrate by the use of wave patterns the action that takes place when a fissure is encountered, because in general, the action that takes place is substantially the same as previously described for the residual magnetic method of detection. It may be explained, however, that when a fissure passes beneath the brush 302 and approaches the pickup device P4, substantially all of the magnetic field surrounding the fissure will collapse so that substantially no impulse will be forwarded to the amplifier 64 to cancel the negative wave pattern at electrical bridge 66. The trigger circuit 70 being responsive to a negative input wave pattern will thus perform its trigger function and actuate the pen magnet. The detection of a fissure by the electro-inductive method is a relatively simple matter, since only one wave pattern need be considered. It is, therefore, deemed more enlightening to show how the apparatus will distinguish a non-fissure defect, such as the dirt spot 308, from such fissure defects, inasmuch as the flux pattern for such a defect is not entirely eliminated at the trailing brush 302.

When a dirt spot is encountered, there is usually some local magnetization of the rail, and/or deflection of the rail current, so as to produce a flux condition about the rail, such as diagrammatically shown at 310. This will produce the wave pattern 312 at the input to the amplifier 46. This wave pattern may be of W-shape configuration like the wave pattern 142 of Fig. 5, having both negative and positive components, but it is not nearly so intense. The positive output wave pattern 314 is applied magnetically to the transfer record wheel 52, as shown at 316, and is again introduced, as at 318, to the amplifier 58. The negative output wave pattern 320 is conducted to the bridge 66.

The magnetic flux surrounding the dirt spot 308 after the latter has passed the brush 302 and arrived at the pickup device P4 may assume a pattern such as diagrammatically shown at 322. This produces the W-shape impulse 324 at the input to the amplifier 64 with rectification and amplification taking place at the output, as at 326, prior to being fed to the bridge 66. The wave patterns 320 and 326 will substantially cancel each other producing a positive wave form 328 at the input to the trigger circuit 70. Because the wave form 328 is positive no trigger action will take place and the pen magnet will not be energized.

THE CIRCUIT DIAGRAM (GENERAL DESCRIPTION)

Figure 9:
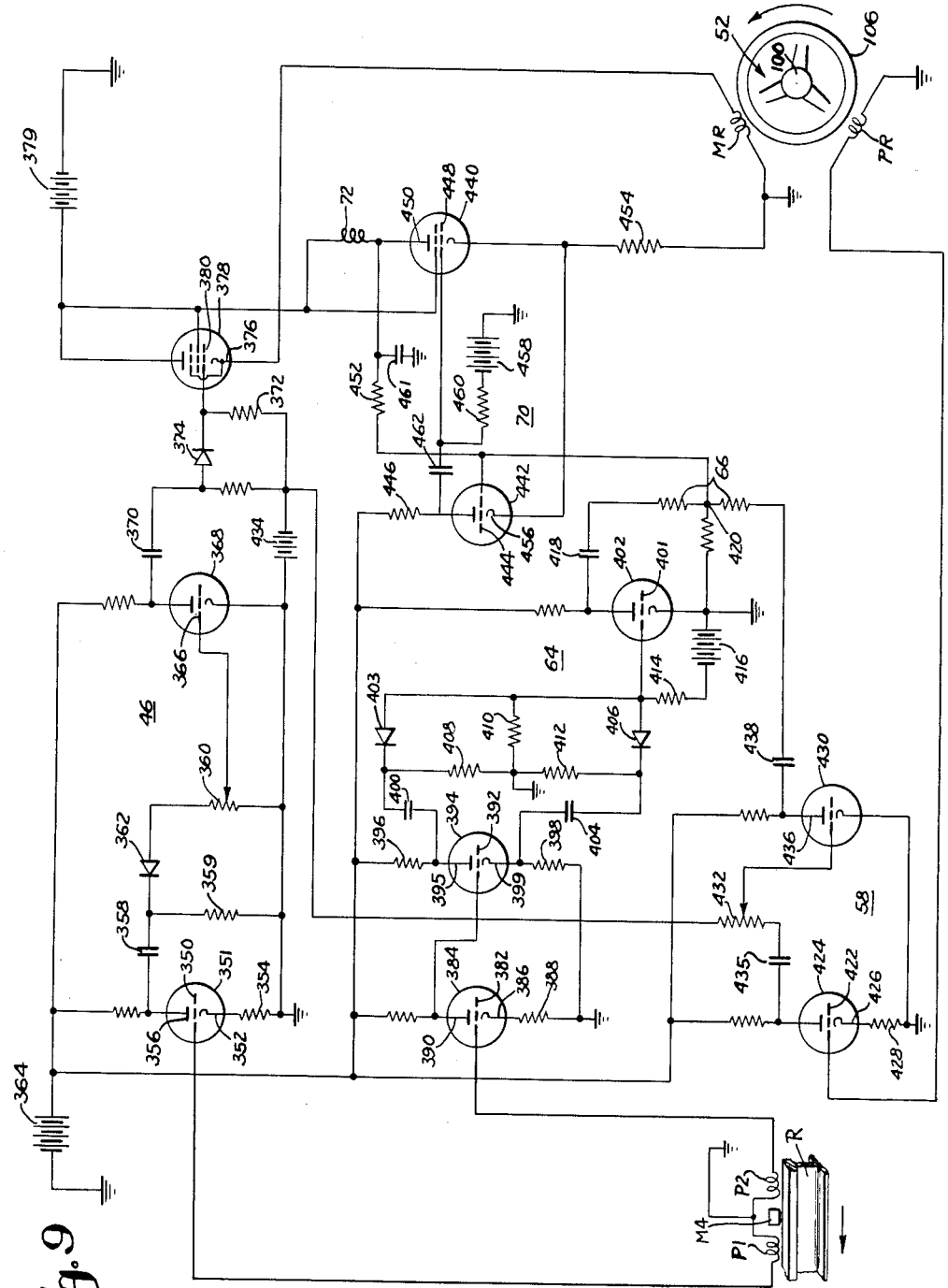
Fig. 9 is a circuit diagram illustrating the operation of certain electronic equipment employed in connection with the present invention.

Referring now to Fig. 9, which is the circuit diagram of the detector apparatus as a whole, the amplifiers 46, 58 and 64, as well as the trigger circuit 70 are preferably constructed as a single self-contained unit and the various thermionic devices and wiring connections therefor may be installed upon a common chassis (not shown). This electronic equipment may be carried in the trailer car 12 and supported upon a suitable work bench where it is conveniently available for inspection and adjustment when necessary.

The amplifier 46

When the inductive pickup P1 passes through a region of increased magnetic flux density (as for example above the fissure 140 of Fig. 5) the impulse 141 (Fig. 8) is impressed upon the control grid 350 of the triode 351. Positive bias is applied to the cathode 352 by the resistance 354 and is of such a magnitude so as to bias triode 351 toward the lower end of its characteristic curve. Thus, triode 351 will linearly amplify signals like impulse 141, having negative peaks of a low amplitude and a positive peak of a high amplitude, since grid 350 will not be raised to a situation potential or lowered to the cut-off potential. The predominant signals on the grid 350 being positive, and, since phase reversal takes place in the triode, the plate 356 will be made more negative as the grid swings more positive. A capacitance 358, coupling resistor 359 and resistor 360, together with an interposed diode rectifier 362, constitute the coupling to the second stage of this amplifier. The diode rectifier may be of the crystal type and will permit only negative impulses, which constitute the predominant part of the impulse on the plate 356, to be passed to the second stage of the amplifier. The positive components of the impulse applied to the rectifier will not be passed to the second stage. Thus, when plate 356 is made more negative, current flow through resistor 360 makes the bias on the second stage more negative, but when plate 356 goes more positive, current cannot flow through diode 362 and the bias on the second stage is unaltered. Resistor 359 provides a path to ground and serves as a "bleeding" resistance.

The unidirectional diode 362 performs the additional function of preventing relatively strong signals, such as are produced at rail joints, from blocking the second stage. Ordinarily, in the absence of the rectifier, signals having a negative component sufficiently strong to cut-off tube 351 will cause a greatly increased voltage to be applied across the condenser terminals. Condenser 358 would be charged by way of grid 366. After the strong rail joint signals pass, condenser 358 will be discharged slowly through resistor 360 to place a large decreasing negative bias on grid 366. If a positive fissure voltage was received on grid 350 immediately after the rail joint signal, this fissure voltage would be applied to the grid 366 of the second stage as a negative signal. The result would be that the fissure signal would not be passed through the second stage and go unrecorded, since the second stage is already highly negatively biased. This undesirable result is avoided by using the unidirectionally conducting diode 362, since it prohibits condenser 358 from being charged.

In the second stage of the amplifier 46, the triode 368 is similar to the triode 351 and it is similarly coupled to the output stage by means of the capacitance 370, resistance 372 and interposed diode rectifier 374. At the grid of this stage, the only signals other than negative ones are either the vestiges of very strong negative input signals that were not completely cut off in the first stage, or harmonics generated beyond the first stage. In the second stage, however, these undesirable signals are completely eliminated.

Since the desirable signals on grid 366 are negative, they will appear across resistor 372 as positive changes in potential due to the inherent inversion of triode 368. Triode 366 is biased close to the saturation end of the characteristic curve so as to receive the largest possible negative swing of grid voltage with a minimum of distortion in the voltage developed across resistor 372. Due to the fact that the signal voltage appears as a positive pulse on the plate of triode 368, the diode rectifier 374 is connected of opposite polarity to diode 362.

The third or output stage of the amplifier 46 is a cathode follower stage, which is to say that the load, i. e. the recording magnet MR is in series relationship with the cathode 376 of the beam power amplifier type tube 378. In this type of circuit, the cathode 376 instead of the plate swings with the signal, thus greatly reducing the possibility of strong signals loading the coupling condenser 370. The grid 380 may thus become positive without conducting, inasmuch as the cathode 376 has a followup action which renders it still more positive. This cathode follower stage, which is biased by means of battery 434 to produce maximum undistorted amplification, is of extremely high fidelity actuating the recording magnet MR faithfully in accordance with the signal pattern without the creation of harmonics. The positive pulse on the grid 380 will, of course, appear as a positive pulse across recording magnet MR.

From the above description, it will be seen that the amplifier 46 is capable of receiving the peak portions of impulses 142 (Fig. 5) rendered when fissures are encountered by the pickup P1 and the positive portions of impulses occasioned by other types of defects and cause them to be recorded or "printed" as magnetized spots, such as the spots 146, 165 and 179 of Figs. 5, 6 and 7, on the temporary record media 106.

The amplifier 64

Generally speaking, the purpose of the amplifier 64 is to provide a positive voltage, such as is shown at 151 in Fig. 5, which may be subtracted from the output negative voltage, such as is shown at 148 of the amplifier 58. The output impulse of the amplifier 64 is positive, regardless of the polarity of the input signal. As previously explained, the magnetic characteristics of some defects, such as burns, are highly unpredictable and the nature of the field existing after the rail has been treated by the deactivator magnet M4 is such that the induced impulse of the pickup P2 will be reversed in polarity relative to the original induced signal in the pickup P1, while in other burns there will be no reversal of polarity.

The pickup P2 impresses its impulse upon the control grid 382 of the triode 384. Triode 384 has cathode 386 biased by means of a resistor 388 so as to normally operate the tube at approximately the center of its characteristic curve. Thus, the plate 390 is capable of swinging more positive or less positive in response to a negative or positive input pulse, respectively. The plate 390 is directly coupled to the grid 392 of the second stage tube 394. The load resistances 396 and 398 in the second stage are divided between the plate and cathode circuits in such a manner as to obtain equal voltage swing on the plate 395 and cathode 399.

Thus, when the grid 392 swings positive, increased plate current will flow through the resistor 396 causing an increased voltage drop thereacross. This voltage drop, subtracted from the supply voltage 364, constitutes the plate voltage of the tube. Therefore, when this voltage drop is greater, the plate voltage is less, and the converse is true also. However, the same value of plate current flows through the cathode resistor 398, thus generating a greater voltage drop thereacross when the grid swings more positive, and a lesser voltage drop when the grid swings more negative. Hence, the voltage on cathode 399 will rise and fall, respectively. Thus, the potential of cathode 399 will always swing in a direction opposite to the potential of the plate 395. The plate 395 is capacitance-coupled, as at 400, to the grid 401 of the tube 402 in the output stage and a crystal rectifier 403 completes the coupling. The rectifier 403 is disposed so as to pass only negative signals. The cathode 399 is similarly coupled by means of the condenser 404 and crystal rectifier 406 to the grid 401. The resistances shown at 408, 410 and 412 are high value grounding resistors.

Tube 402 is biased by means of battery 416. A coupling resistor 414 is connected between battery 416 and grid 401. Thus, when grid 392 goes positive, cathode 399 will increase in potential and plate 395 will decrease in potential. Condenser 400 will pass the negative impulses through rectifier 403 and these will appear as negative pulses on grid 401. Conversely, when grid 392 goes more negative, cathode 399 goes more negative, so that condenser 404 will pass a negative impulse through diode 406, to provide a negative pulse on grid 401. By this arrangement, all signals applied to the grid 401 will be negative inasmuch as any positive signals issuing from the plate 395 or from the cathode 399 will be blocked by diodes 403 and 406.

The circuit thus far described is such that signals generated by the pickup P2 are converted into amplified signals of negative polarity which are applied to the grid 401 in the output stage. The tube 402 in this latter stage is biased by means of a resistor 414 and battery 416 toward the upper end of its characteristic curve to permit high positive swinging of the plate potential. The coupling condenser 418 is connected to one end of the bridge resistor 66 (Fig. 1), and the other end of the resistor is connected to the output of the amplifier 58. The center tap 420 is connected to the input of the trigger circuit 70.

*The amplifier 58*

The purpose of the amplifier 58 is to receive negative impulses, the positive ouput signal of amplifier 46 having been inverted by means of magnets PR and MR, from the record pickup or take-off magnet PR at the transfer-recording wheel 52 and amplify them for subsequent application to the bridge 66. The record pickup magnet PR is connected to the grid 422 of the triode 424 in the first stage of the two-stage amplifier 58. The cathode 426 is resistor-biased, as at 428, and the stage is designed for class A operation. The tube 430 in the second stage is designed for class B operation, the tube being biased by means of a resistor 432 and battery 434. The resistor 432 affords sensitivity control. The plate of tube 424 is coupled to the grid of tube 430 by coupling condenser 435.

The plate 436 is connected through a coupling condenser 438 to the bridge 66 which, as previously stated, also receives impulses from the amplifier 64. The amplifier 58 is thus a simple two-stage amplifier which receives and yields negative impulses. Since the trigger circuit 70 is responsive only to negative impulses, the output impulses of the amplifier 58 are capable of causing the trigger circuit 70 to function, providing, of course, that it is not prevented from doing so by the application of cancellation signals of a positive nature from the amplifier 64.

*The trigger circuit 70*

The trigger action of the circuit 70 is accomplished by connecting the output of the power tube 440 to a triode 442 in such a manner as to obtain powerful regeneration with the triode being biased beyond the upper knee of the amplification curve to prevent self-triggering or oscillation. The negative impulse employed for the triggering action and issuing from the bridge 66 is applied to the grid 444 of the tube 442, thus reducing the plate current and consequently reducing the voltage drop across the resistor 446 to increase the plate voltage. The increased positive plate voltage is applied to the grid 448 of the power tube 440, thus causing the latter to conduct current. When the plate 450 thus passes current, a corresponding voltage drop is developed across the load, i. e., the pen magnet 72 (see also Fig. 1). In its quiescent state, the plate 450 is not conductive and is at a high voltage. A bleeder resistor 452 causes positive biasing of the grid 444 of the triode 442. However, a negative impulse applied to the grid 444 ultimately results in a decrease in voltage on the power tube plate 450. As the voltage is reduced on plate 450, the voltage drop across resistor 452 will also fall and thereby reduce the positive bias on grid 444 of triode 442. Since the positive bias on grid 444 is reduced when a negative signal is applied thereto, the action is regenerative. This plate to grid regeneration is augmented by the use of a cathode resistor 454 which is common to power tube 440 and triode 442 and through which the relatively heavy plate current of power tube 440 flows to render the cathode 456 more positive. Rendering the cathode more positive has the effect of making the grid more negative and thereby contributes to the regeneration.

The battery 458 supplies the large negative bias required by the power tube while the resistor 460 permits the grid 448 to swing with the output voltage of triode 442. The condenser 461 is a timing condenser and its value, together with the value of the coupling condenser 462 and the various resistance values employed, is determined according to engineering exigencies to obtain the desired sensitivity and time duration of each pulse. The power tube 440 is conductive when the coupling condenser 462 is being charged. When the condenser 462 is no longer being charged, power tube 440 cuts off, inverse regeneration takes place, and the trigger circuit becomes dormant with the system in equilibrium.

While there have been described several particular embodiments of the invention, it is to be understood that the invention is not restricted thereto, and it is intended that all modifications thereof shall be covered which would be apparent to one skilled in the art and which come within the spirit and scope of the invention.

I claim:

1. The method of differentiating between fissure defects and non-fissure defects encountered in a rail during progressive exploration thereof which comprises the steps of treating progressive increments of the rail to produce characteristic magnetic fields in the vicinity of such defects and, thereafter, while such fields remain prevalent, progressively exploring the rail with an inductive pickup capable of setting up electrical impulses when such fields are encountered, utilizing the electrical impulses set up by said pickup to magnetize a record media and produce a stored magnetic record of the impulses thereon, altering the magnetic characteristics of at least some of the previously produced magnetic fields, progressively exploring the rail with a second inductive pickup capable of setting up electrical impulses when the altered magnetic fields are encountered, progressively converting the stored magnetic impulses on the record media into electrical impulses and simultaneously combining them electrically with the corresponding electrical impulses set up by said second pickup, and utilizing the resultant combined impulses to perform useful work.

2. The method of differentiating between fissure defects and non-fissure defects encountered in a rail during progressive exploration thereof which comprises the steps of treating progressive increments of the rail to produce characteristic magnetic fields in the vicinity of such defects and, thereafter, while such fields remain prevalent, progressively exploring the rail with an inductive pickup capable of setting up electrical impulses when such fields are encountered, utilizing the electrical impulses set up by said pickup to progressively magnetize a constantly moving record media and produce a temporary stored magnetic record of the impulses thereon, further treating progressive increments of the rail to alter the magnetic characteristics of the previously produced magnetic fields, simultaneously exploring the rail and moving record media with separate inductive pickups capable of setting up electrical impulses when the altered magnetic fields and magnetic characteristics of the record media are encountered to produce respective commensurate electrical impulses, combining said latter impulses electrically and utilizing the resultant combined impulses to perform useful work.

3. The method of differentiating between fissure defects and non-fissure defects encountered in a rail during progressive exploration thereof which comprises the steps of subjecting the rail to longitudinal magnetic flux to produce characteristic residual magnetic fields in the vicinity of such defects and thereafter progressively exploring the rail with an inductive pickup capable of setting up electrical impulses when such fields are encountered, utilizing the electrical impulses set up by said pickup to magnetize a record media and produce a stored magnetic record of the impulses thereon, further treating progressive increments of the rail to alter the magnetic characteristics of the previously produced magnetic fields, progressively exploring the rail with a second inductive pickup capable of setting up electrical impulses when the altered magnetic fields are encountered while simultaneously progressively converting the stored magnetic impulses on the record media into electrical impulses and combining them electrically with the corresponding electrical impulses set up by said second pickup, and utilizing the resultant combined impulses to perform useful work.

4. The method of differentiating between fissure defects and non-fissure defects encountered in a rail during progressive exploration thereof for operating a recording apparatus which comprises the steps of treating progressive increments of the rail to produce characteristic magnetic fields in the vicinity of such defects and, thereafter, while such fields remain prevalent, progressively exploring the rail with an inductive pickup capable of setting up electrical impulses when such fields are encountered, utilizing the electrical impulses set up by said pickup to magnetize a record media and produce a stored magnetic record of the impulses thereon, further treating progressive increments of the rail to alter the magnetic characteristics of the previously produced magnetic fields, progressively exploring the rail with a second inductive pickup capable of setting up electrical impulses when the altered magnetic fields are encountered, progressively converting the stored magnetic impulses on the record media into electrical impulses, simultaneously amplifying corresponding electrical impulses set up by said second pickup and by said conversion of magnetic impulses on the record media and combining the thus amplified impulses electrically, and utilizing the resultant combined impulses to perform useful work.

5. The method of differentiating between fissure defects and non-fissure defects encountered in a rail during progressive exploration thereof for operating a recording apparatus which comprises the steps of treating progressive increments of the rail to produce characteristic magnetic fields in the vicinity of such defects and, thereafter, while such fields remain prevalent, progressively exploring the rail with an inductive pickup capable of setting up electrical impulses when such fields are encountered, utilizing the electrical impulses set up by said pickup to magnetize a record media and produce a stored magnetic record of the impulses thereon, further treating progressive increments of the rail to alter the magnetic characteristics of the previously produced magnetic fields, progressively exploring the rail with a second inductive pickup capable of setting up electrical impulses when the altered magnetic fields are encountered, progressively converting the stored magnetic impulses on the record media into electrical impulses, simultaneously amplifying corresponding electrical impulses set up by said second pickup and by said conversion of magnetic impulses on the record media and combining the thus amplified impulses electrically, feeding the thus combined impulses into a trigger circuit capable of output energization upon receiving an input impulse of predetermined polarity, and utilizing said trigger circuit to actuate said recorder.

6. The method of differentiating between fissure defects and non-fissure defects encountered in a rail during progressive exploration thereof for operating a recording apparatus which comprises the steps of treating progressive increments of the rail to produce magnetic fields in the vicinity of such defects and, thereafter, while such fields remain prevalent, progressively exploring the rail with an inductive pickup capable of setting up electrical impulses when such fields are encountered, utilizing the electrical impulses set up by said pickup to magnetize a record media and produce a stored magnetic record of the impulses thereon, further treating progressive increments of the rail to alter the magnetic characteristics of the previously produced magnetic fields, progressively exploring the rail with a second inductive pickup capable of setting up electrical impulses when the altered magnetic fields are encountered, progressively converting the stored magnetic impulses on the record media into electrical impulses, oppositely polarizing the corresponding electrical impulses set up by said second pickup and by said conversion of magnetic impulses on the record media, combining the polarized impulses electrically, utilizing the combined impulses to actuate a trigger circuit susceptible to unidirectional input impulses, and utilizing said trigger circuit to operate said recording apparatus.

7. The method of differentiating between fissure defects and non-fissure defects encountered in a rail during progressive exploration thereof which comprises the steps of passing unidirectional current through progressive increments of rail extent to produce characteristic magnetic fields in the vicinity of such defects and, thereafter, while such fields remain prevalent, progressively exploring the rail with an inductive pickup capable of setting up electrical impulses when such fields are encountered, utilizing the electrical impulses set up by said pickup to magnetize a record media and produce a stored magnetic record of the impulses thereon, discontinuing the flow of unidirectional current through progressive increments of the rail extent to allow the magnetic fields to at least partially collapse, progressively exploring the rail with a second inductive pickup capable of setting up electrical impulses when the partially collapsed fields are encountered, progressively converting the stored magnetic impulses on the record media into electrical impulses and simultaneously combining them electrically with corresponding impulses set up by said second pickup, and utilizing the resultant combined impulses to perform useful work.

8. In an apparatus for progressively detecting the presence of flaws in rail and for distinguishing flaws of a predetermined physical character from other flaws of another physical character, means for setting up characteristic magnetic fields in the vicinity of flaws of said predetermined character and for setting up other magnetic fields in the vicinity of said other flaws, support means movable along the rail, a first inductive pickup device mounted on said support means and movable along the rail and adapted, when a flaw is encountered, to become inductively coupled to the magnetic field surrounding the same to produce an electrical impulse of commensurate wave pattern, a second inductive pickup device mounted on said support means in spaced relationship to said first pickup device and fixed relative thereto and movable along the rail in unison with said first pickup device and adapted to trail the latter, means mounted on said support means and interposed between said pickup devices and likewise movable along the rail in unison with said devices for altering the character of the fields previously set up in the vicinity of said flaws, said second pickup device being adapted upon encountering a flaw previously explored by said first pickup device to become inductively coupled to the altered magnetic field surrounding the flaw, a magnetizable record media movable in timed relation to the movement of said pickup devices along the rail between a record-receiving station and a record take-off station, a recording magnet at said record-receiving station, an inductive record pickup device at said record take-off station, an amplifier having its input operatively connected to said first pickup device and having its output operatively connected to said recording magnet, a second amplifier having its input operatively connected to said record take-off device, a third amplifier having its input operatively connected to said second pickup device, means establishing an electrical bridge having an input operatively connected to the output of each of said second and third amplifiers, a trigger circuit having its input operatively connected to the output of said electrical bridge and having an output responsive only to combined input impulses of predetermined polarity, and a work circuit operatively connected to said trigger circuit output.

9. In an apparatus for progressively detecting the presence of flaws in rail and for distinguishing flaws of a predetermined characteristic from flaws of another characteristic, means movable along the rail for inducing a flow of current through a constantly changing rail section from a leading point of current entry to a trailing point of current withdrawal to set up characteristic magnetic fields in the vicinity of flaws of said predetermined character and to set up other magnetic fields in the vicinity of other flaws, support means movable along the rail, a first inductive pickup mounted on said support means and movable along the rail between said points of current entry and withdrawal and adapted, when a flaw is encountered, to produce an electrical impulse of commensurate wave pattern by its inductive coupling to the magnetic field surrounding the same, a second inductive pickup mounted on said support means and movable along the rail and trailing said point of current withdrawal and adapted upon encountering a flaw previously explored by said first pickup to become inductively coupled to any residual magnetic field which may remain in the vicinity of the flaw, a magnetizable record media movable in timed relation to the movement of said pickup devices along the rail between a record-receiving and a record take-off station, a recording magnet at said record-receiving station and electrically connected to the first pickup for receiving impulses from the latter and for impressing them magnetically upon said record media, an inductive record take-off pickup at said record take-off station, an electrical bridge having one input electrically connected to said record take-off pickup and having another input electrically connected to said second inductive pickup, a trigger circuit having its input operatively connected to the output of said electrical bridge and responsive only to electrical impulses of a predetermined character issuing therefrom, and a work circuit operatively connected to the output of said trigger circuit.

10. In an apparatus for progressively detecting the presence of flaws in rail and for distinguishing flaws of one characteristic from flaws of another characteristic, means movable along the rail for inducing a flow of current through a constantly changing rail section to set up characteristic magnetic fields in the vicinity of flaws, support means movable along the rail, a first inductive pickup mounted on said support means and movable along the rail within the confines of said rail section and adapted when a flaw is encountered, to produce an electrical impulse by its inductive coupling to the magnetic field surrounding the same, a second inductive pickup mounted on said support means and movable along the rail removed from said rail section and adapted to become inductively coupled to any residual magnetic fields surrounding a flaw when encountered, a magnetizable record media movable in timed relation to the movement of said pickups along the rail between a record-receiving station and a record take-off station, a recording magnet at the record-receiving station, an inductive take-off pickup at said record take-off station, means electrically connecting said recording magnet to the first pickup, an electrical bridge electrically connected to said second pickup and to said record pickup magnet for reception of electrical impulses therefrom, a trigger circuit electrically connected to the bridge and responsive only to output impulses of a predetermined characteristic for energization thereof, and a work circuit operatively connected to the output of said trigger circuit.

11. In an apparatus for progressively detecting the presence of flaws in rail and for distinguishing fissure defects from other types of defects, means movable along the rail for magnetizing the rail to set up characteristic magnetic fields in the vicinity of fissure defects and to set up other characteristic magnetic fields in the vicinity of other defects, support means movable along the rail, a first inductive pickup mounted on said support means and movable along the rail and adapted, when a flaw is encountered, to become inductively coupled to the magnetic field surrounding the same to produce an electrical impulse of commensurate wave pattern, a second inductive pickup mounted on said support means in spaced relationship to said first pickup and fixed relative thereto and movable along the rail bodily in unison with the first pickup and trailing the latter, means mounted on said support means and interposed between said pickups and likewise movable along the rail in unison with the same for altering the character of the fields previously set up in the vicinity of said flaws, said second pickup being adapted upon encountering a flaw previously explored by said first pickup to become inductively coupled to the altered magnetic field surrounding the flaw, means for magnetically storing impulses initiated by said first pickup due to encounter with a flaw until such time as the second pickup encounters said flaw and for releasing the stored impulse at such time in the form of an electrical impulse, means for combining such released impulses with impulses initiated by said second pickup, a work circuit, and selective means responsive to said combined impulses for energizing said work circuit.

12. In an apparatus for progressively detecting the presence of flaws in rail and for distinguishing fissure defects from other types of defects, means movable along the rail for magnetizing the rail to set up characteristic magnetic fields in the vicinity of fissure defects and to set up other characteristic magnetic fields in the vicinity of other defects, support means movable along the rail, a first inductive pickup mounted on said support means and movable along the rail and adapted, when a flaw is encountered, to become inductively coupled to the magnetic field surrounding the same to produce an electrical impulse of commensurate wave pattern, a second inductive pickup mounted on said support means in spaced relationship to said first pickup and fixed relative thereto and movable along the rail in unison with the first pickup and trailing the latter, means mounted on said support and interposed between said pickups and likewise movable along the rail in unison with the same for altering the character of the fields previously set up in the vicinity of said flaws, said second pickup being adapted upon encountering a flaw previously explored by said first pickup to become inductively coupled to the altered magnetic field surrounding the flaw, a magnetizable record media movable in timed relation to the movement of said pickup devices along the rail between a record-receiving and a record take-off station, a recording magnet at said record-receiving station, an amplifier having its input connected to said first pickup and its output connected to said recording magnet, a record take-off magnet at said record take-off station, an electrical bridge having a pair of inputs and a single output, an amplifier having its input connected to said record take-off magnet and its output connected to one of said bridge inputs, an amplifier having its input connected to the second pickup and its output connected to the other bridge input, a trigger circuit having its input connected to the bridge output, and a work circuit connected to the output of said trigger circuit.

13. The method of differentiating between fissure defects and non-fissure defects encountered in a rail during progressive exploration thereof which comprises the steps of treating progressive increments of the rail to produce characteristic magnetic fields in the vicinity of such defects and, thereafter, while such fields remain prevalent, progressively exploring the rail with an inductive pickup capable of setting up electrical impulses when such fields are encountered, utilizing the electrical impulses set up by said pickup to produce a stored record of the impulses thereon, altering the magnetic characteristics of at least some of the previously produced magnetic fields, progressively exploring the rail with a second inductive pickup capable of setting up electrical impulses when the altered magnetic fields are encountered, progressively converting the stored impulses on the record media into electrical impulses and simultaneously combining them electrically with the corresponding electrical impulses set up by said second pickup, and utilizing the resultant combined impulses to perform useful work.

14. The method of differentiating between fissure defects and non-fissure defects encountered in a rail during progressive exploration thereof for operating a recording apparatus which comprises the steps of treating progressive increments of the rail to produce characteristic magnetic fields in the vicinity of such defects and, thereafter, while such fields remain prevalent, progressively exploring the rail with an inductive pickup capable of setting up electrical impulses when such fields are encountered, utilizing the electrical impulses set up by said pickup to produce a stored record of the impulses thereon, further treating progressive increments of the rail to alter the magnetic characteristics of the previously produced magnetic fields, progressively exploring the rail with a second conductive pickup capable of setting up electrical impulses when the altered magnetic fields are encountered, progressively converting the stored impulses on the record media into electrical impulses, simultaneously amplifying corresponding electrical impulses set up by said second pickup and by said conversion of impulses on the record media and combining the thus amplified impulses electrically, and utilizing the resultant combined impulses to perform useful work.

References Cited in the file of this patent

UNITED STATES PATENTS

| | | |
|---|---|---|
| 2,535,353 | Drake et al. | Dec. 26, 1950 |
| 2,540,870 | Farmer | Feb. 6, 1951 |
| 2,609,457 | Thurm | Sept. 2, 1952 |
| 2,610,257 | Wissmann | Sept. 9, 1952 |
| 2,618,687 | Straehl | Nov. 18, 1952 |